US006016395A

United States Patent [19]

Mohamed

[11] Patent Number: 6,016,395
[45] Date of Patent: Jan. 18, 2000

[54] PROGRAMMING A VECTOR PROCESSOR AND PARALLEL PROGRAMMING OF AN ASYMMETRIC DUAL MULTIPROCESSOR COMPRISED OF A VECTOR PROCESSOR AND A RISC PROCESSOR

[75] Inventor: Moataz Ali Mohamed, Santa Clara, Calif.

[73] Assignee: Samsung Electronics Co., Ltd., Chung-Ku, Rep. of Korea

[21] Appl. No.: 08/731,455

[22] Filed: Oct. 18, 1996

[51] Int. Cl.[7] ....................................................... G06F 9/45
[52] U.S. Cl. ............................... 395/705; 395/705; 709/1; 709/2
[58] Field of Search ...................... 395/705, 706, 395/707, 708, 709; 712/1, 2, 3, 4, 5, 6, 7, 8, 9, 10

[56] References Cited

U.S. PATENT DOCUMENTS

| | | | |
|---|---|---|---|
| 4,101,960 | 7/1978 | Stokes et al. | 364/200 |
| 4,722,052 | 1/1988 | Scheuneman | 364/200 |
| 4,791,560 | 12/1988 | Lahti et al. | 364/200 |
| 4,821,181 | 4/1989 | Iwasawa et al. | 364/200 |
| 4,933,839 | 6/1990 | Kinoshita et al. | 364/200 |
| 4,945,479 | 7/1990 | Rusterholz et al. | 364/200 |
| 5,029,069 | 7/1991 | Sakamura | 364/200 |
| 5,109,523 | 4/1992 | Kanada et al. | 395/800 |
| 5,206,903 | 4/1993 | Kohler et al. | 379/309 |
| 5,274,818 | 12/1993 | Vasilevsky et al. | 395/700 |
| 5,341,482 | 8/1994 | Cutler et al. | 395/375 |

*Primary Examiner*—Tariq R. Hafiz
*Assistant Examiner*—Kakali Chaki
*Attorney, Agent, or Firm*—Skjerven, Morrill, MacPherson, Franklin & Friel; Fabio E. Marino; Omkar K. Suryadevara

[57] ABSTRACT

The present invention provides a new programming language which. is a superset of C++ optimized for writing vectorized dual-threaded programs on the MSP media processor. This invention discloses novel language constructs in the syntax and semantics to facilitate efficient programming and the generation of optimized efficient MSP object code. We have invented in VIVID new data types such as VECTOR and GMASK as well as new operators that map directly into the MSP instruction set such as @shfl, @avg, etc. We have also extended C++ to facilitate dual-threaded execution by exposing the MSP's fork-join model to the VIVID programmer via. adding fork-join constructs to VIVID. We have also invented a syntax and semantics to facilitate having multiple returned results from a vector operation such as VD @@ VC=VA @shfl VB.

35 Claims, 4 Drawing Sheets

PROGRAMMING A VECTOR PROCESSOR AND PARALLEL PROGRAMMING OF AN ASYMMETRIC DUAL MULTIPROCESSOR COMPRISED OF A VECTOR PROCESSOR AND A RISC PROCESSOR

BACKGROUND OF THE INVENTION

1. Field of the invention

The present invention relates to generating executable code from a program written in a high-level programming language and, in particular, to generating executable code for a vector processor from a program written in a high-level language. The present invention also relates to generating parallel executable code from a program written in a high-level language.

2. Description of Related Art

High-level languages such as ANSI C and C++ provide only limited support for vector operations. The C language is described in "The C Programming Language" by Brian W. Kernighan and Dennis M. Ritchie (Englewod Cliffs, N.J.: Prentice-Hall, Inc. 1978) and the C++ language is described in "Programming in C++" by Stephen C. Dewhurst and Kathy T. Stark (Englewood Cliffs, N.J.: Prentice-Hall, Inc. 1989), which are herein incorporated by reference in their entirety. In C/C++, for example, vectors can be accessed at the level of their individual elements. That is, to add a vector_a to a vector_b and store the result in a vector_c a programmer would write a loop to iterate through each element of vector_a and vector_b and store the result in the corresponding element of vector_c. The C/C++ code for this operation could be:

int i, vector_a[10], vector_b[10], vector_c[10];
    for(i=0, i<10, i++)
       {vector_c[i]=vector_a[i]+vector_b[i];}

An exception to this rule is that static vector arrays may be initialized in a single assignment operation in the declaration, as shown below:

int vector_a[10]={10, 8, 3, 5, 7, 23, 12, 1, 0, 9};

Vector processors, on the other hand, support a variety of instructions that operate on an entire vector as a single element, rather than as a collection of elements. To generate such instructions, a compiler for a program performing vector operations would have to recognize vector operations from code such as the above example given for the addition of vector_a and vector_b. There is thus a need for a high-level language to facilitate recognition of vector operations by a compiler.

It is also desirable to provide a high level interface to allow the programmer to control communication between two processors.

SUMMARY

The present invention allows creating a computer program for execution by a vector processor, which is generated by reading a program written in a high level programming language and containing one or more statements having a vector operand and generating an executable program containing one or more second instructions that implement the statements. The invention also allows creating a dual threaded computer program for a dual multiprocessor which includes a vector processor and a RISC processor.

One embodiment is a programming language which is a superset of C++. The embodiment allows the programmer to write high level C++ code according to the programming model of a vector processor, while also exposing the vector processor's instruction set to the programmer via new language constructs.

The language specifies the vector extensions to the ANSI C/C++ language, including both the data types and the new language constructs. In addition, the language assists the compiler in generating optimized vector instructions by providing interfaces in the extended language to expose the low level hardware features to the high level programmer.

In some embodiments, a high level language provides a high level interface to allow the programmer to control communication between the two processors. The language exposes instructions that control such communication. Thus, in some embodiments, the high level language exposes a fork instruction which instructs a master processor to activate a slave processor. The language also exposes a joint instruction that instructs the slave processor to signal to the master processor that the slave processor has finished the task for which the slave processor was activated.

DESCRIPTION OF THE PREFERRED EMBODIMENTS

Figure 3:
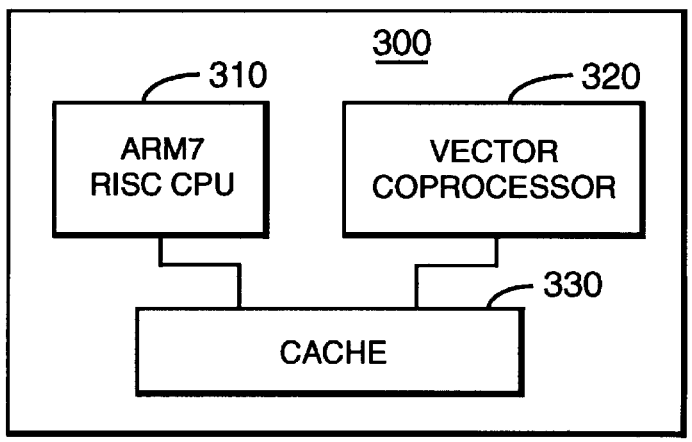
FIG. 3 is a block diagram of a dual processor suitable for dual-threaded applications according to the present invention.

VIVID is a vectorized programming language based on C++ for writing programs on the Multimedia Signal Processor (MSP®). MSP® is a vector processor developed by Samsung Semiconductor Inc. of San Jose, Calif. The MSP is described in U.S. patent application Ser. No. 08/699,597, filed on Aug. 19, 1996 and entitled "Single-Instruction-Multiple-Data Processing in a Multimedia Signal" by Le Trong Nguyen, which is incorporated herein by reference in its entirety. In FIG. 3, MSP® 300 contains a vector processor (VP) 320, also called herein a vector co-processor (VCP), a master processor ARM7 310 coupled by a cache memory 330.

Figure 2:
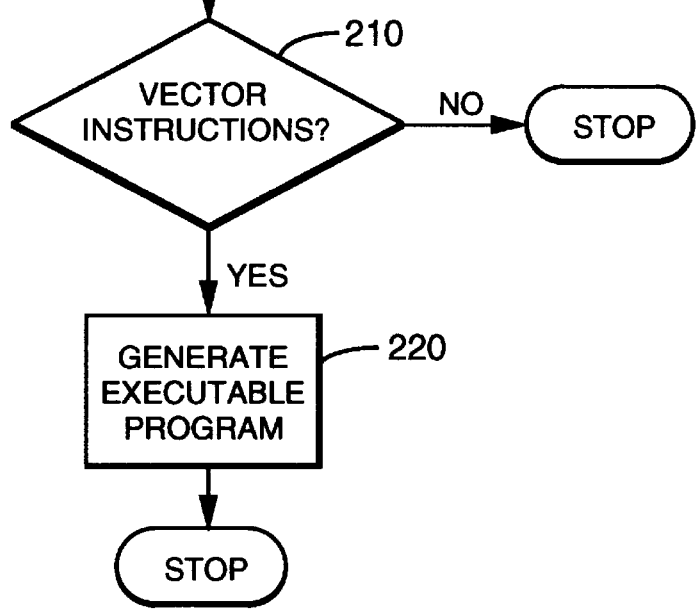
FIG. 2 is a flow diagram of the process of generating an executable program from a program written in a high-level programming language according to the present invention.

VIVID augments the standard ANSI C/C++ language with special data types and language constructs to facilitate efficient and intuitive programming in the dual threaded vectorized style and to aid the compiler in generating efficient and optimized MSP Instruction Code. Thus VIVID provides a high-level language interface for a vector processor. High-level language interface exposes the instruction set of vector processor 320 to a software developer using a general purpose computer. A description of the MSP processor and the ARM7 and VP instruction sets are provided in Appendices A–F. A compiler suitable for use with the present invention is available from Metaware Corp. of Santa Cruz, Calif. FIG. 2 illustrates the process of generating an executable program from a program written in a high-level language. First, at stage 200, the VIVID compiler (not shown) reads the high-level language, then at stage 210 the compiler determines if the high-level language program contains any VIVID (i.e. vector) instructions. If the program does not contain vector instructions, no further action is required by the VIVID compiler and the program can be compiled by any C/C++ compiler. If the program does contain VIVID instructions, these instructions are translated into a program executable by a vector processor in stage 220.

New Data Types

The language extends the ANSI C/C++ language with the following new data types.

VECTOR

_VECTOR <<element data type>, <number of elements>> vector_identifier

The above declaration declares the vector_identifier to be a vector of the specified number of elements. A vector is a plurality of variables or constants, typically of the same <element data type>. In some embodiments, these variables or constants are stored contiguously in the logical address space of a computer's storage. The <number of elements> in the vector is independent of the MSP hardware implementation. The number of elements can be any number, including an odd or prime number. The VIVID compiler generates code accordingly. For example, the current hardware implementation of the MSP supports vectors each of which has thirty-two 9-bit bytes (the ninth bit in each byte is ignored in operations not involving the byte9 data type, described below). The number of elements in the above declaration, however, could be 20, 50, or 128, or greater.

Example Declarations:

```
_VECTOR <short int, 64> x;
_VECTOR <char, 32> C;
```

Suppose the vector size (i.e. the <umber of elements>) in the declarations above is 128, and the hardware implementation uses 32 byte vectors. Suppose a VIVID program includes the following statements:

```
_VECTOR < int, 128 > VA, VB, VC;
VC = VA + VB;
```

Then the VIVID compiler will generate the following code, shown in assembler form. The assembler format and the vector processor instructions are described in Appendix F. The VIVID statement VC=VA+VB can be replaced by the following VIVID "functional syntax" statement:

```
VC = _vvadd(VA, VB);
```
Both code segments above generate the following VP code:
```
VLI.w SR1, VA_address //loads the address of
                    vector
                    //VA in scalar register SR1.
                    //The scalar registers are described
                    //in Appendix C.
VL.w VR1, SR1, #0    //loads the first 8 words
                    //(32bytes) of VA into vector
                    //register VR1. The vector registers
                    //are described in Appendix C.
VL.w VR2, SR1, #8    //loads second 32 bytes
VL.w VR3, SR1, #16   //loads third 32 bytes
VL.w VR4, SR1, #24   //loads fourth 32 bytes
//Load the VB data
VLI.w SR2, VB_address
VL.w VR11, SR2, #0   //loads first 32
VL.w VR12, SR2, #8   //loads second 32
VL.w VR13, SR2, #16  //loads third 32
VL.w VR14, SR2, #24  //loads fourth 32
//Do the vector add for the full 128 bytes vector.
VADD.w VR20, VR1, VR11
VADD.w VR21, VR2, VR12
VADD.w VR22, VR3, VR13
VADD.w VR23, VR4, VR14
```

Thus, first the address in logical memory at which VA is stored is loaded into scalar register SR1, then all elements of VA are loaded in vector registers VR1-VR4, each storing 32 bytes of data (8 elements of VA) from their location in logical memory. The VL instruction references logical memory locations by means of a base scalar register and an immediate value offset that is added to the address stored in the register. An immediate value is an operand whose value is supplied to the CPU as part of the instruction, rather than as an address to a register. For clarity, immediate value operands in VP assembly code are prefaced by a "#". Then, VB is loaded into vector registers VR11–VR14 by using a similar procedure. Finally, VR1–VR4 and VR11–VR14 are added, element by element, and the results are stored in vector registers V20–V23.

In vector-scalar mixed mode, i.e. if a scalar value is to be added to each element of a vector, either of the following VIVID statements performs the addition:

```
_VECTOR<int, 8>VC, VA;
int x;
VC = VA + x;
VC = _vsadd(VA, x);//functional syntax
```

A register allocator portion of the VIVID compiler allocates different vector registers, or reuses the same register in generating the code to implement arbitrarily large vectors, depending on the situation, and the heurisitics employed. To allow the register allocation portion to perform efficiently with the current MSP implementation, the fixed upper bound on the number of vector elements in the _VECTOR declaration is 256 bytes. However, other embodiments have different limits on the number of elements of a vector and the present invention is not limited to any particular number of vector elements.

The _VECTOR data type is treated as a "first class citizen" of the VIVID C++ language, and thus can appear within STRUCTS, UNIONS, and all other constructs of C++ that expect a primitive data type. _VECTOR data can also be passed as parameters and returned as results.

For example, within a STRUCT, a vector can appear as follows:

```
struct myStruct {
    int ID;
    _VECTOR< int, 8> VA;
```

```
    char name;
};
```

The compiler has to allocate sufficient memory for the structure based on the declared \_VECTOR size. Note, however, that the "first class citizen" status does not imply that type casts and conversions between \_VECTOR types and other data types are allowed.

In some embodiments, VIVID statements having more than one \_VECTOR operand require all vector operands to be of the same data type and number of elements. In some embodiments, the data type of the elements of \_VECTOR operands is required to be a signed quantity.

\_MATRIX

```
    __MATRIX <<element_data_type>, <#rows>, <#cols>>
matrix_identififier
```

The above construct declares the variable "matrix\_identifier" to be a matrix of the specified number of elements. A matrix is a multi-dimensional vector. For simplicity, a two-dimensional matrix is described. However, it is clear to those skilled in the art how to extend this description to cover matrices having more than two dimensions. The number of elements per row or column is independent of the MSP hardware implementation. The number of elements can be any number, including an odd or prime number. By convention, all \_MATRIX operations in VIVID operate on the elements in row major fashion. That is, each element by element operation will operate first on all elements of the first row, then on all the elements of the second row, etc. The VIVID compiler generates the code accordingly to allocate the \_MATRIX in several vector registers in the VP. Each vector register contains a row or a portion of a row. Suppose, for example, the following VIVID code is present:

```
    __MATRIX< int, 8, 8> MA, MB, MC;
    MC = MA + MB;
```

The generated VP code allocates each of the matrices in 8 vector registers, each vector register containing 8 integer elements. For simplicity, we call the vectors containing the A matrix VA1–VA8, the registers containing the B matrix VB1–VB8 and the registers containing the C matrix VC1–VC8 and assume that the registers have been loaded with the values of matrices A, B and C using the same scheme used for vectors VA and VB in the previous example for VC=VA+VB. The MSP code generated by the compiler is thus:

```
    VADD.w VC1, VA1, VB1
    VADD.w VC2, VA2, VB2
    VADD.w VC3, VA3, VB3
    VADD.w VC4, VA4, VB4
    VADD.w VC5, VA5, VB5
    VADD.w VC6, VA6, VB6
    VADD.w VC7, VA7, VB7
    VADD.w VC8, VA8, VB8
```

Thus, each element of \_MATRIX MA is added to the corresponding element (i.e. the element having the same index) of \_MATRIX MB and the result is stored in the corresponding element of \_MATRIX MC.

In the current implementation the operations defined on the \_MATRIX data type are restricted to addition, subtraction, multiplication and averaging. Addition, subtraction and multiplication are the conventional arithmetic operations performed element by element on elements having the same index values in the \_MATRIX operands. Averaging consists of an addition followed by a division by two. However, other embodiments define other instructions on the \_MATRIX data type and the present invention is not limited to any specific set of operations defined on the \_MATRIX data type.

Byte-9 Data Type

The MSP provides a special 9-bit data type byte9 that is intended for use in MPEG applications. This data type is supported in VIVID as a new data type which is treated as char for most purposes, except that the instructions generated are all in byte9 mode. For example, the following statements in VIVID would generate the following instructions:

```
    byte9 x, y, z;
    z=x+y;
Generates the code:
    VADD.b9 x, y, z;
Similarly:
    __vector <byte9, 32> VA, VB, VC;
    VC = VA @mad VB;
Generates the code:
    VMAD.b9 VC, VA, VB;
```

Global MASKS

VIVID also extends the C language by defining two special data types named element mask and memory mask. The Element Mask is treated as a special purpose 32-bit scalar value which defines the valid elements to be operated upon in vector ALU operations (for a complete listing of the operations affected by the element mask, see Appendix F). A bit in the mask is set if the corresponding byte or byte9 (9-bit byte) in the vector register operands will be operated on in vector ALU operations. For example, the mask 11110000111100001111000011110000 selects every other word (4 bytes) of the vector operands for the ALU operations. The remaining words will not be operated on. If no element mask is defined, operations affected by the element mask operate on all the elements of the vector (i.e. the default mask has a logical one in every bit). The following VIVID code declares an Element Mask:

```
    EMASK E;
    EMASK = <constant_hex_value>;
    EMASK = 0xABCD120F;//hex value ABCD120F
```

The Memory Mask is treated similarly as a special purpose scalar register which defines the valid elements to be operated upon in all vector load/store operations to/from memory. If no memory mask is defined, operations affected by the memory mask operate on all the elements of the vector (i.e. the default mask has a logical one in every bit). The following VIVID code declares a Memory Mask:
MMASK M;

```
MMASK M;
MMASK = <constant_hex_value>;
MMASK = 0xABCD120F;//hex value ABCD120F
```

For example, the following sequence of statements would cause every odd numbered element in vectors VB and VC to be added together.

```
_VECTOR<int, 8>VB: { 1, 2, 3, 4, 5, 6, 7, 8};
_VECTOR<int, 8>VC:{ 11, 12, 13, 14, 15, 16,
17, 18};
_VECTOR<int, 8>VD: { 1, 1, 1, 1, 1, 1, 1, 1};
EMASK = 0XF0F0F0F0;//Note that this hex pattern is
            // binary 11110000111100001111000011110000
VD = VB + VC;
Thus, after execution of the preceding code segment:
    VD = {12, 1, 16, 1,20, 1, 24, 1};
```

Initialization of Vectors

VIVID uses the same style of initialization of vectors that C provides for arrays, structures, etc. Thus to initialize a vector or a matrix, one specifies the data in the declaration as follows:

```
_VECTOR <int, 8> A = { 100, 27, 28, 29, 30, 31,32,
33};
_MATRIX< int, 2,2> M= { 4, 5, 6, 7};
```

Since matrices are operated on in a row major fashion the above declaration assigns values to elements as follows:

```
M[0,0] = 4;
M[0,1] = 5;
M[1,0] = 6;
M[1,1] = 7;
```

In the expression M[i,j], i is the row number and j is the column number. The value of i varies from 0 to teh number of rows minus one. The value of j varies from 0 to the number of columns minus one.

NEW Special Vector Operations

To facilitate efficient utilization of the MSP features, and to assist the compiler in generating better code, VIVID provides a high level programming interface to several special vector operations that are available as special instructions. These operations are enumerated below.

Add & Add sign

```
_VECTOR<int, 8>VC, VA, VB;
int s;
VC = VA @aas3 VB;
Functional Syntax:
    VC = _vvaas3 (VA, VB);
In case of vector-scalar mixed mode
    VC = _vsaas3 (VA, s);
```

This function adds each element of vector VA having an index i to the element of VB having an index i to generate an intermediate sum, it then adds the sign (1 +if the value of the element is positive, −1 if the value of the element is negative and 0 if the value of the element is zero) of the ith element of VA to the intermediate result and stores this value into the ith element of VC if called with two vector arguments. This function adds the scalar s to each element of vector VA having an index i to generate an intermediate result, adds the sign of the ith element of VA to the intermediate result and stores this value into the ith element of VC if called with one vector and one scalar argument. The statements above generate the following VP code respectively:

```
VAAS3.w    VR3, VR1, VR2 // VR1, VR2, VR3 store
                         // VA, VB, VC respectively
VAAS3.w    VR2, VR1, SR1 // VR1, VR2, SR1 store
                         // VA, VC, s respectively
```

Add Horizontal

```
_VECTOR<int, 8>VC, VA, VB;
int s;
VC = VA @addh VB;       //Add horizontal
VC = VA @addh s;
Functional Syntax:
    VC = _vvaddh(VA,VB);
    VC = _vsaddh(VA,s);
```

Figure 6:
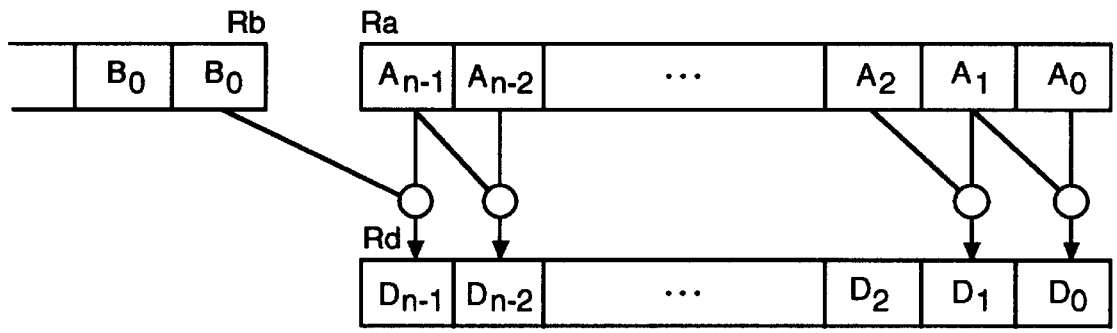
FIG. 6 is a block diagram of an "add horizontal" operation according to the present invention.

This function adds each element of vector VA with index value i to the element having an index value of i+1 and stores the sum in the element having an index value of i of vector VC, as shown in FIG. 6. If @addh is called with two vector operands, the last element of vector VA is added to the first element of vector VB and stored into the last element of vector VC. If @addh is called with one vector and one scalar operand, the last element of VA is added to the scalar operand and the result is stored in the last element of VC. The statements above generate the following VP code:

```
VADDH.w    VR3, VR1, VR2 // VR1, VR2, VR3 store
                         // VA, VB, VC respectively
VADDH.w    VR2, VR1, SR1 // VR1, VR2, SR1 store
                         // VA, VC, s respectively
Vector AND _VECTOR<int, 8>VC, VA, VB;
VC = VA & VB;//Vector AND
Functional Syntax:
    VC = _vvand(VA,VB);
```

This function calculates the logical AND of vectors VA and VB and stores it in vector VC. That is a bit in VC is a logical one only if both of the corresponding bits in VA and VB are also logical ones, otherwise the VC bit is a logical zero. The statements above generate the following VP code:

```
VAND.w    VR3, VR1, VR2   // VR1, VR2, VR3 store
                          // VA, VB, VC respectively
Vector OR _VECTOR<int, 8>VC, VA, VB;
VC = VA|VB;//Vector OR
Functional Syntax:
    VC = _vvor(VA,VB);
```

This function calculates the logical OR of vectors VA and VB and stores it into vector VC. That is a bit in VC is a logical one if either of the corresponding bits in VA and VB are logical ones, otherwise the VC bit is a logical zero. The statements above generate the following VP code:

```
VOR.w      VR3, VR1, VR2    // VR1, VR2, VR3 store
                            // VA, VB, VC respectively
Vector NOR _VECTOR<int, 8>VC, VA, VB;
    VC = VA @nor VB;
Functional Syntax:
    VC = _vvnor(VA,VB);
```

This function calculates the logical NOR of vectors VA and VB and stores it into vector VC. That is a bit in VC is a logical one if either, but not both, of the corresponding bits in VA and VB are logical ones, otherwise the VC bit is a logical zero. The instruction above generates the following MSP code:

```
VNOR.w     VR3, VR1, VR2    // VR1, VR2, VR3 store
                            // VA, VB, VC respectively
Vector Shift _VECTOR<int, 8>VC, VA;
    int s;
    VC = VA >> s;  //right shift
    VC = VA << s;  //left shift
Functional Syntax:
    VC = _vasr(VA,s);  //right shift
    VC = _vasl(VA,s);  //left shift
```

This function performs an arithmetic shift right each element of vector VA by s bits. An arithmetic shift is a shift operation in which the sign of every element is preserved. Signed integers are represented in two's complement notation. In the case of _vasr, the sign is preserved by inserting the appropriate number of zeroes or ones (zeroes for non-negative numbers and ones for negative numbers) in place of the MSBs vacated by the shift. In the case of _vasl, the vacated LSBs are filled with zeroes. The sign is preserved by saturating (i.e. replacing) the value to the most negative (all zeroes with a single one in the MSB) or the most positive (all ones with a zero in the MSB) values in case of overflow (i.e. the sign bit is "shifted out"). For example, if an element of vector VA had binary value 010 . . . 0, i.e. $2^{30}$ and the elements of the vector where shifted left by one bit, the value of the element would be 100 . . . 0, i.e. $-2^{31}$. To prevent the sign of the value stored in the element from changing the element value is replaced by the maximum positive or negative number having the same sign as the value originally stored by the element, in this case, 011 . . . 1, i.e. $2^{31}-1$. The statements above generate the following VP code:

```
VASR.w    VR2, VR1, SR1    // shift right
                           // VR1, VR2, SR1 store
                           // VA, VC, s respectively
VASL.w    VR2, VR1, SR1    // shift left
                           // VR1, VR2, SR1 store
                           // VA, VC, s respectively
Vector Absolute Subtract _VECTOR<int, 8>VC, VA, VB;
    int s;
    VC = VA @asub VB;
Functional Syntax
    VC = _vvasub(VA,VB)
    VC = _vsasub(VA,s)
```

This function subtracts the value of each element of vector VB having an index i from the value of the element of vector VA having index i and stores the absolute value of the result of the subtraction in the ith element of vector VC if called with two vector arguments. The function subtracts the value of scalar s from the value of the ith element of vector VA and stores the absolute value of the result in the ith element of vector VC if called with one vector and one scalar arguments. The instructions above generate the following MSP code respectively:

```
VASUB.w    VR3, VR1, VR2    // VR1, VR2, VR3 store
                            // VA, VB, VC respectively
VASUB.w    VR2, VR1, SR1    // VR1, VR2, SR1 store
                            // VA, VC, s respectively
Vector Average _VECTOR<int, 8>VC, VA, VB;
    int s;
    VC = VA @avg VB;
Functional Syntax:
    VC = _vvavg(VB,VA);
    VC = _vsavg(VB, s);
```

This function calculates the average of vectors VA and VB and stores the result in vector VC if called with two vector arguments. The function averages each element of vector VA with scalar s and stores the result in vector VC if called with one vector and one scalar argument. The instructions above generate the following MSP code respectively:

```
VAVG.w     VR3, VR1, VR2    // VR1, VR2, VR3 store
                            // VA, VB, VC respectively
VAVG.w     VR2, VR1, SR1    // VR1, VR2, SR1 store
                            // VA, VC, s respectively
Vector Horizontal Average _VECTOR<int, 8>VC, VA, VB;
    int s;
    VC = VA @avgh VB;
Functional Syntax:
    VC = _vvavgh(VB,VA);
    VC = _vsavgh(VB, s);
```

Figure 7:
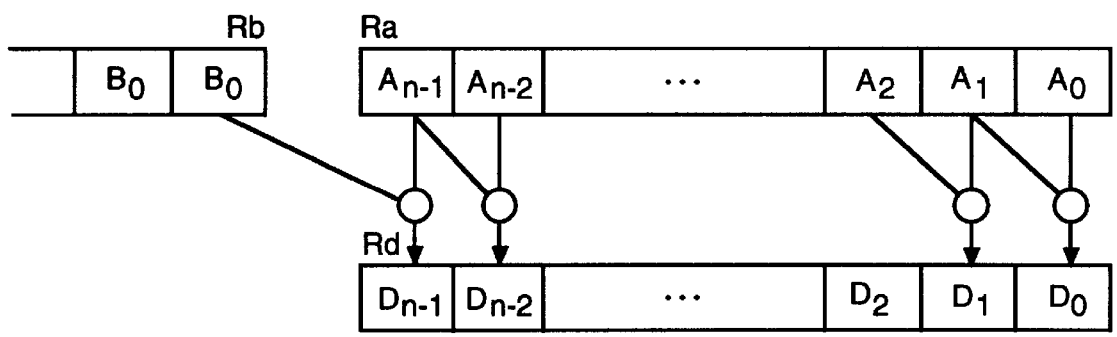
FIG. 7 is a block diagram of an "average horizontal" operation according to the present invention.

This function calculates the average of each element of vector VA with index value i with the element having an index value of i+1 and stores the value in the element having an index value of i of vector VC, as shown in FIG. 7. The last element of vector VA is averaged with the first element of vector VB and stored in the last element of vector VC if called with two vector arguments. The last element of vector VA is averaged with scalar s and stored in the last element of vector VC if called with one vector and one scalar argument. The instructions above generate the following MSP code respectively:

```
VAVGH.w    VR3, VR1, VR2    // VR1, VR2, VR3 store
                            // VA, VB, VC respectively
VAVGH.w    VR2, VR1, SR1    // VR1, VR2, SR1 store
                            // VA, VC, s respectively
Vector Quad Average _VECTOR<int, 8>VC, VA, VB;
    VC = VA @avgq VB;
Functional Syntax:
    VC = _vvavq(VB,VA);
```

Figure 8:
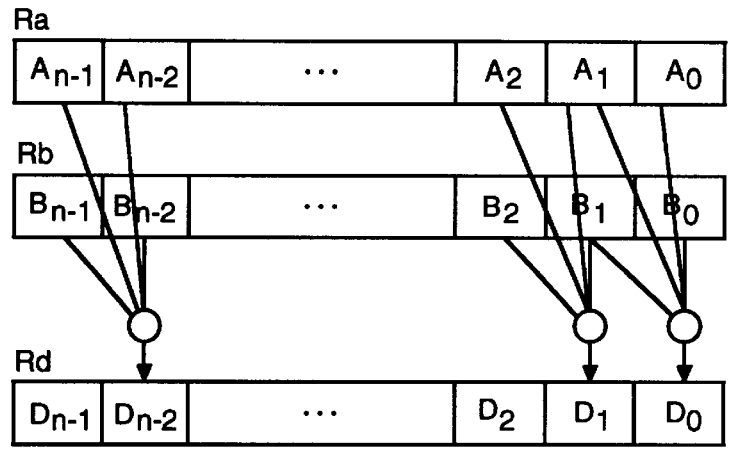
FIGS. 8–14 are block diagrams of operations of a vector processor used in some embodiments of the present invention.
Figure 9:
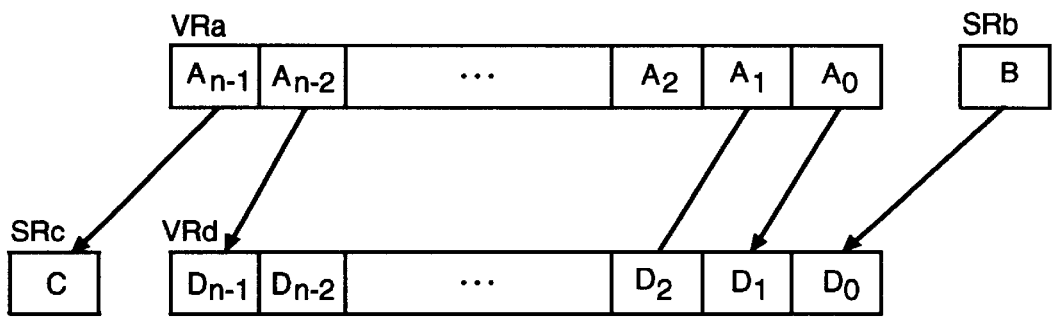

This function calculates the average of each element of vector VA having an index value i with the element of VA having index value i+1 and the elements of vector VB having index values i and i+1 and stores the result in the element of vector VC having index value i, as shown in FIG. 8. The last element of vector VC is undefined. The statements above generate the following VP code:

```
VAVGQ.w    VR3, VR1, VR2
```
Vector Float to Fixed Conversion

```
__VECTOR<float, 8>VA;
__VECTOR<int, 8>VC;
int s;
VC = VA @cvtff s;
Functional Syntax:
    VC = __vcvtff(VA,s)
```

This function converts each 32-bit floating point element of vector VA to a fixed point element of vector VC. Each element of VC is a 32-bit floating point number having an integer part and a fractional part. In each element of VC, the integer part occupies the s MSBs, while the fractional part occupies the remaining bits. The statements above generate the following VP code:

```
VCVTFF   VR3, VR1, SR1  // VR1, VR2, SR1 store
                        // VA, VC, s respectively
```
Vector Integer to Float Conversion

```
__VECTOR<int, 8>VA;
__VECTOR<float, 8>VC;
VC = @cvtif VA;
Functional Syntax:
    VC = __vvcvtif(VA)
```

This function converts each 32-bit integer element of vector VA to a floating point element of vector VC. The statements above generate the following VP code:

```
VCVTIF    VR2, VR1    // VR1, VR2 store
                      // VA, VC respectively
```
Vector Compare and Set Mask

```
__VECTOR<int, 8>VA, VB;
MMASK M;
M = VA "c_op" VB;
Functional Syntax
    M = __vcmpv(VA, VB, c_op)
    Where "c_op" is <,<=,>,>=,==, or !=.
```

This function executes an element-wise comparison of vectors VA and VB and stores the result into mask M. The mask M has a certain number of bits for each element position in the vector. This number of bits is dependent on the data size. Typically, one bit is reserved for each byte or byte9 in each element of the vector. For example, for the element data type int four bits are allocated in the mask, since the size of an int is four bytes. A number of bits, dependent on the <element data type>, of mask M corresponding to the ith element position is set if the c_op operation on the ith elements of VA, VB produces the TRUE result and is reset otherwise. The bits in the mask appear int he same position as the elements in the vector. Mask M can be either an EMASK or a MMASK variable.

Vector Count Leading Zeros.

```
__VECTOR<int, 8>VC, VA;
VC = @vcntlz VA;
Functional Syntax:
    VC = __vvcntlz (VA);
```

This functions counts the number of leading zeroes in each element of vector VA and writes that value in the corresponding element of vector VC. The functions above generate the following MSP code:

```
VCNTLZ.w    VR2, VR1
```
Vector Divide by $2^N$.

```
__VECTOR<int, 8>VC, VA;
int i;
VC = VA @div2n i;
Functional Syntax:
    VC = __vdiv2n(VA,i)
```

This function divides vector VA by $2^i$ and stores the result in vector VC. The statements above generate the following VP code:

```
VDIV2N    VR2, VR1, SR1   // VR1, VR2, SR1 store
                          // VA, VC, i respectively
```
Vector Extract

```
__VECTOR<int, 8>VA;
int s,i;
s = VA @extrt i;
Functional Syntax:
    s = __vextrt(VA,i)
```

This function extracts the ith element of vector VA and stores it into scalar s. The statements above generate the following VP code:

```
VEXTRT.w    SR2, VR1, SR1   // VR1, SR1, SR2 store
                            // VA, i, s respectively
```
Vector Extract Sign

```
__VECTOR<int, 8>VA;
VC = @extsgn2 VA;
VC = @extsgn3 VA;
Functional Syntax:
    VC = __vextsgn2 (VA);
    VC = __vextsgn3 (VA);
```

These functions extract the sign (−1, 0, 1) of each element of vector VA and store it into the corresponding element of vector VC. If a VA element is positive, its sign is 1. If a VA element is negative, its sign is −1. If @extsgn2 is used, the sign of a zero element is 0. The instructions above generate the following MSP code respectively:

```
VEXTSGN2.w    VR2, VR1    // VR1, VR2 store
                          // VA, VC respectively
VEXTSGN3.w    VR2, VR1    // VR1, VR2 store
                          // VA, VC respectively
```
Element Shift of a vector by one

```
__VECTOR<int, 8>VC, VA;
int sa, sb;
VC @@ sa = VA @esr sb;
VC @@ sa = VA @esl sb;
Functional syntax:
    __vesr(Vc, sa, VA, sb);
    __vesl(VC, sa, VA, sb);
```

Figure 10:
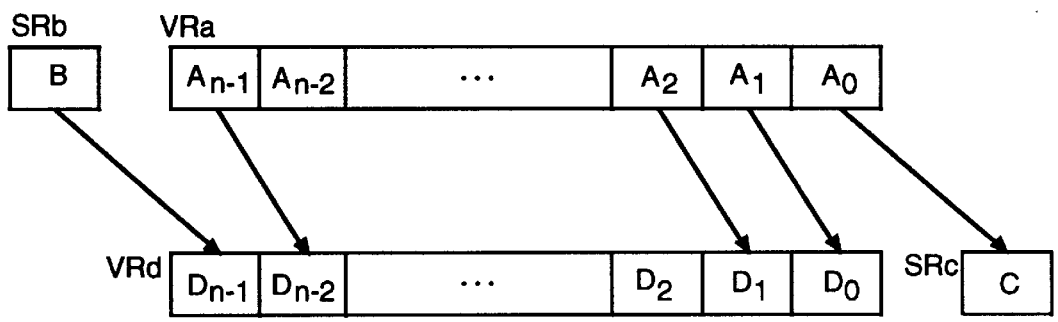
Figure 11:
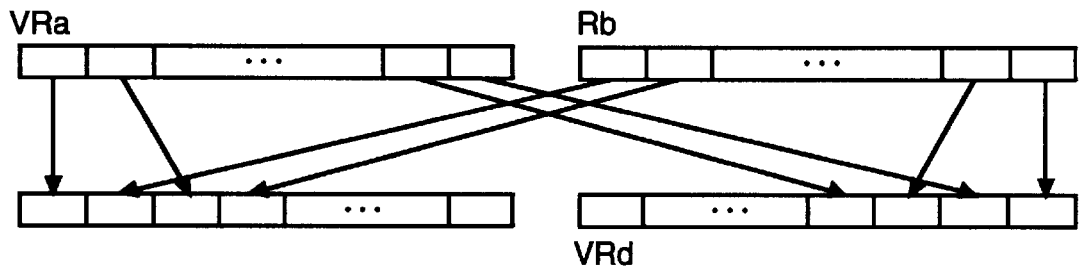
Figure 12:
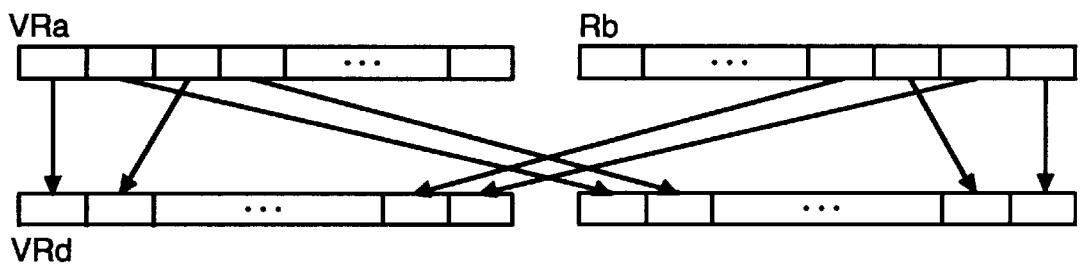
Figure 13:
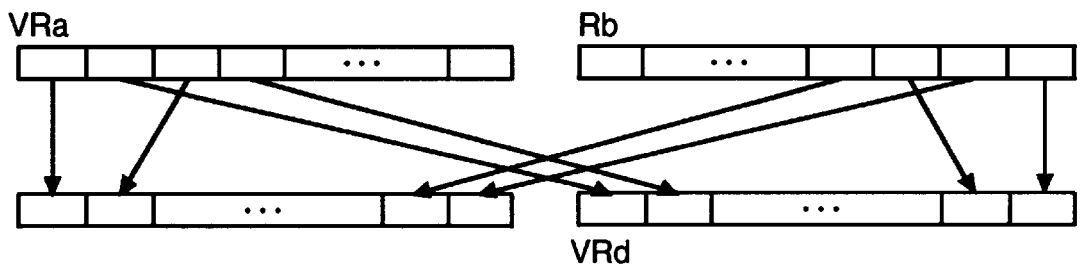
Figure 14:
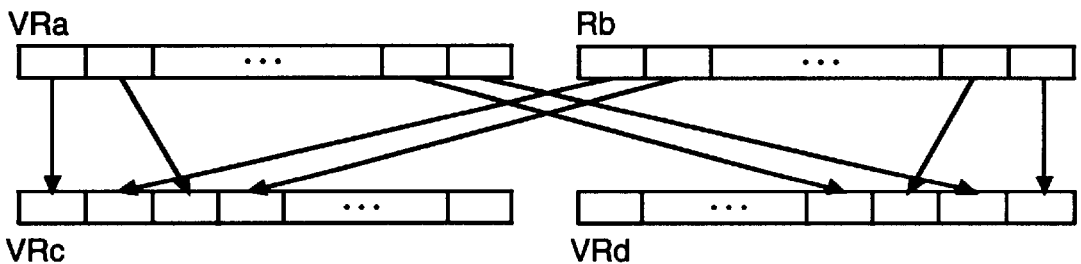

The function @esr shifts the elements of the VA vector right by 1 position, storing the resulting vector into VC and the shifted out rightmost element into sa, as shown in FIG. 10. The leftmost element of VA is supplied by sb. Likewise, the function @esl shifts the elements of the VA vector left by 1 position, storing the resulting vector into VC and the shifted out leftmost element into sa, as shown in FIG. 10. The rightmost element of VA is supplied by sb. The statements above generate the following VP code:

```
VESR.w    SR2, VR2, VR1, SR1    // VR1, VR2, SR1, SR2
                                // store VA, VC, sa,
                                // sb respectively
VESL.w    SR2, VR2, VR1, SR1    // VR1, VR2, SR1, SR2
                                // store VA, VC, sa,
                                // sb respectively
```

Vector Insert

```
__VECTOR<int, 8>VC, VA;
int s;
VC = VA @insrt s;
Functional syntax:
    VC = __vinsrt(VA, s)
```

Vector Logical Shift

```
__VECTOR<int,8>VC, VA;
int s;
VC = VA @lsl s;    //left shift
VC = VA @lsr s;    //right shift
Functional syntax:
    VC = __vlsl(VA,s);    //left shift
    VC = __vlsr(VA,s);    //right shift
```

These functions perform a logical shift of each element of vector VA by s places in the specified direction and fill the remaining bits with zeroes. The statements above generate the following VP code respectively:

```
VLSL.w    VR2, VR1, SR1    // VR1, VR2, SR1 store
                           // VA, VC, s respectively
VLSR.w    VR2, VR1, SR1    // VR1, VR2, SR1 store
                           // VA, VC, s respectively
```

Vector Multiply

```
__VECTOR<int,8>VC, VS, VA, VB;
__VECTOR<int,8>VD, VE;
VD @@ VE = VA @mad(VB, VC);
VS = VA @madl(VB, VC);
VC @@ VS = VA @mul VB;
VD = VA @mulf VB;
VC = VA @mull VB;
Functional syntax:
    __vmad(VD, VE, VA, VB, VC);
    __vmadl(VS, VA, VB, VC);
    __v*mul(VS, VA, VB, VC);
    __v*mulf (VD, VA, VB);
    __v*mull(VS, VA, VB);
```

The function @mad first multiplies each element of VA by the corresponding element of VB, then adds the corresponding element of VC to the double precision result of the multiplication and stores the double precision result of the addition in the corresponding element of double precision vector VD. The function @madl performs the same function except that only the lower portion (the least significant words) of the result are stored into single precision vector VS. The function @mul multiplies each element of VA by the corresponding element of VB and stores the upper portion (the most significant words) of the double precision result into the corresponding element of VC and the lower portion of the result in the corresponding element of VS. The instruction @mulf multiplies each element of vector VA by the corresponding element of VB, then shifts the double precision result left by one bit and stores the result into the corresponding element of double precision vector VD. The instruction @mull multiplies each element of VA by the corresponding element of VB and stores the lower portion (the LSBs) of the double precision result into the corresponding element of VS. The functions above generate the following VP code, respectively:

```
VMAD.w     VR3, VR4, VR1, VR2    // VR1, VR2, VR3, VR4
                                 // store
                                 // VA, VB, VC, VD
                                 // respectively
VMADL.w    VR3, VR4, VR1, VR2    // VR1, VR2, VR3, VR4
                                 // store
                                 // VA, VB, VC, VS
                                 // respectively
VMUL.w     VR3, VR4, VR1, VR2    // VR1, VR2, VR3, VR4
                                 // store
                                 // VA, VB, VC, VS
                                 // respectively
VMULF.w    VR3, VR1, VR2         // VR1, VR2, VR3 store
                                 // VC, VA, VB respectively
VMULL.w    VR3, VR1, VR2         // same as above
```

Vector Max Exchange

```
__VECTOR<int, 8>VC, VA;
VC = @maxe VA;
Functional Syntax
    VC = __vmaxe(VA);
```

This function compares each even/odd pair (elements 0–1, 2–3, 4–5, etc.) of elements in vector VA and stores the lesser of the elements in the odd position of vector VC (VC[1], VC[3], VC[5] . . . ) and the greater in the even position (VC[0], VC[2], VC[4] . . . ). The statements above generate the following VP code:

```
VMAXE.w    VR2, VR1    // VR1, VR2 store
                       // VA, VC respectively
```

Vector Rotate

```
__VECTOR<int, 8>VC, VA, VB;
int i;
VC = VA @rol i;
VC = VA @ror i;
Functional Syntax
    VC = __vrol(VA,i)    //rotate left
    VC = __vror(VA,i)    //rotate right
```

These functions rotate each element of vector VA by i bit positions and store the result in vector VC. In @rol the bits are rotated left (LSB to MSB). In @ror the bits are rotated right (MSB to LSB). The instructions above generate the following MSP code respectively:

```
VROL.w    VR2, VR1, SR1    //VR1, VR2, SR1 store
                           //VA, VC, i respectively
VROR.w    VR2, VR1, SR1    //VR1, VR2, SR1 store
                           //VA, VC, i respectively
```

Operations with Multiple Returned Results

Handling multiple returned results is not straightforward in C++. However, the MSP instruction set supports the architectural concept of returning the results in two vector registers or two scalar registers.

VIVID therefore provides specialized syntax for multiple destinations to extend the standard C++ assignment operation.

Vector Logical Shift

```
__VECTOR<int, 8>VC, VD, VA;
int i;
VC = VA @lsl i;
VC = VA @lsr i;
Functional syntax:
    VC = __vlsl(VA, i);
    VC = __vlsr(VA, i);
```

These functions logically shift each element of vector VA by i number of bits and store the result in the corresponding element of vector VB. In the case of @lsl, the i LSBs are filled with zeroes. In the case of @lsr, the i MSBs are filled with zeroes. The functions above generate the following MSP code, respectively:

```
VLSL.w    VR2, VR1, SR1 // VR1, VR2, SR1 store
                        // VA, VC, i respectively
VLSR.w    VR2, VR1, SR1 // same as above
```

Shuffle

```
__VECTOR<int, 8>VC, VD, VA, VB;
VC @@ VD = VA @shfl VB;
Functional Syntax:
    __vshfl(VC, VD, VA, VB);
```

Figure 4:
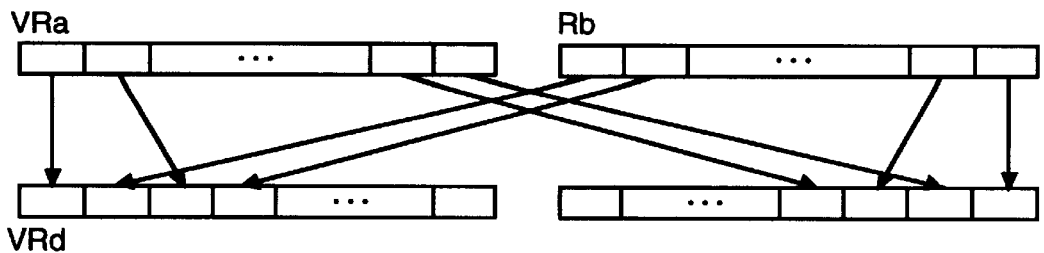
FIG. 4 is a block diagram of a "shuffle" operation according to the present invention.

This function shuffles the elements of vector VA and VB and stores the result in vectors VC and VD, as shown in FIG. 4. More particularly, VB is stored in the even-numbered elements (words 0, 2, . . . ) of VC:VD (concatenation of VC and VD), and VA is stored in the odd-numbered elements:

```
VD[0]=VB[0], VD[2]=VB[1], ... VD[14]=VB[7],
VC[0]=VB[8], VC[2]=VB[9], ... VC[14]=VB[15];
VD[1]=VA[0], VD[3]=VA[1], ... VD[15]=VA[7]
VC[1]=VA[8], VC[3]=VA[9], ... VC[15]=VA[15].
The statements above generate the following VP
code:
    VSHFL.w   VR3, VR4, VR1, VR2   // VR1, VR2, VR3,
                                   // VR4 store VA,
                                   // VB, VC, VD
                                   // respectively
```

Unshuffle

```
VC @@ VD = VA @unshfl VB;
Functional Syntax:
    __vunshfl(VC, VD, VA, VB);
```

Figure 5:
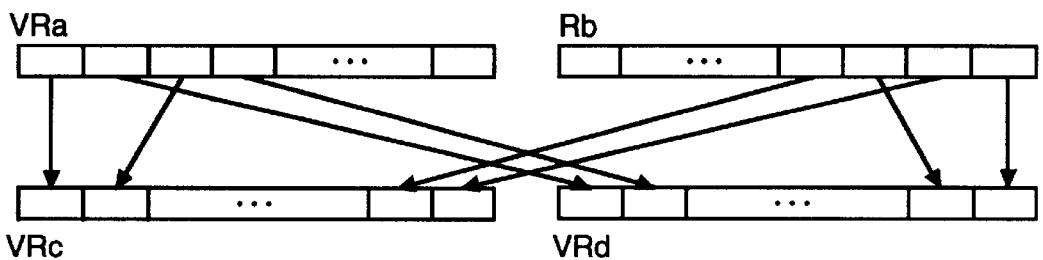
FIG. 5 is a block diagram of an "unshuffle" operation according to the present invention.

This function performs the inverse operation of @shfl, i.e. it unshuffles vectors VA and VB and stores the result into vectors VC and VD, as shown in FIG. 5. More particularly, the even-numbered elements (words 0, 2, . . . ) of VA:VB are copied into VD, and the odd elements of VD:VA are copied into VC:

```
VD[0]=VB[0], VD[1]=VB[2], ... VD[7]=VB[14],
VD[8]=VA[0], VD[9]=VA[2], ... VD[15]=VA[14];
VC[0]=VB[1], VC[1]=VB[3], ... VC[7]=VB[15],
VD[8]=VA[1], VD[9]=VA[3], ... VD[15]=VA[15].
```

The statements above generate the following VP code:

```
VUNSHFL.w   VR3, VR4, VR1, VR2 // VR1, VR2, VR3,
                               // VR4 store VA,
                               // VB, VC, VD
                               // respectively
```

Overloading existing C operators for VECTOR data types

To allow for __VECTOR operators to use the same syntax as standard data types in C and C++, some operators are overloaded, i.e. when the compiler recognizes one of these operators it looks at the data type of the operands in order to generate the appropriate machine instruction. The following is a list of the existing C/C++ operators that are overloaded for __VECTOR data types.

Standard Arithmetic operations on vectors

All the standard arithmetic operations are overloaded to work on vectors. This includes additions, subtractions, multiplications, divisions, etc.

Thus the following VIVID code:

```
__VECTOR<int, 8>VC, VA, VB;
VC = VA + VB;
would generate the following MSP code:
    VADD.w    VR3, VR1, VR2 // VR1, VR2, VR3 store
                            // VA, VB, VC respectively
Similarly
    VC = VA * VB;
would generate
    VMUL.w    VR3, VR1, VR2 // same as above
and
    VC = VA - VB;
would generate
    VSUB.w    VR3, VR1, VR2 // same as above
and
    VC = VA && VB
would generate
    VAND.w    VR3, VR1, VR2 // same as above
```

Logical shift right/left of the elements of a vector

```
__VECTOR<int, 8>VC, VA;
int s;
VC = VA >> i;
VC = VA << i;
```

The shift operator in VIVID is overloaded to mean element-wise shift. The above expressions denote that each element of the Vector VA is shifted respectively right or left by i bits, with zeroes filled in the most significant bits. The instructions above generate the following MSP code respectively:

```
VLSR.w    VR2, VR1, SR1
VLSL.w    VR2, VR1, SR1
```

Multiply ADD

The following multiply/add construct is recognized by the compiler

```
__VECTOR<int, 8>VC, VD, VA, VB;
VD = VA * VB + VC;
```

The compiler generates the following MSP code:
    VMAD.w VR3, VR4, VR1, VR2

Averaging

The following expression is also recognized by the compiler

```
__VECTOR<int, 8>VC, VA, VB;
VC = (VA + VB) / 2;
```

The compiler generates the following MSP code:

VAVG.w VR3, VR1, VR2

Operator Precedence and Expression Evaluation

The precedence rules for the @operators are as follows:

1) Unary operators have the highest precedence, i.e.

@extsgn VA @addh VB is interpreted as:

(@extsgn VA) @ addh VB.

2) Operators that return multiple results such as @shufl and @unshfl have lower precedence than operators that return a single result. This is to ensure that the multiple results are the last generated results such that they do no cause a semantic conflict with an operation that is expecting a smaller number of source operands.

For example, the statements

__VECTOR<int, 8>VC, VD, VA, VB, VX, VY;

VD @@ VC=VA @shfl VB @addh VX @avg VY;

are interpreted as follows:

VD @@ VC=VA @shfl ((VB @addh VX) @avg VY);

In other words, the shuffle is the last operation to be performed.

Similarly,

VD @@ VC=VA @ addh VB @avg VY @shfl VZ;

are interpreted as follows:

VD @@VC=((VA @addh VB) @avg VY) @shfl VZ;

3) When operators have equal precedence, the left to right precedence rule is applied.

Pointers to Vectors & Alias Analysis

VIVID also provides facilities to use pointers to vectors. The declaration has to provide the size of the vector the pointer is pointing at. In other words, the size of the __VECTOR is treated as an integral part of the data type and is thus required as part of the declaration. As a result, the declaration of a pointer to a vector is as follows:

__VECTOR<int, 16>*VA;

The preceding code declares VA to be a pointer to a vector of sixteen 32-bit integers.

Standard pointer arithmetic of the ANSI C is supported on the vector pointers. Thus for example, one can use the vector pointer to index a specific element in the vector, or to pass the address of the vector to a function, etc. Some examples of typical usage of vector pointer are presented below.

Indexing through a Vector pointer

To select a specific element in a vector via the vector pointer, one just adds the index of the element to the pointer value and then uses the * operator as follows:

```
__VECTOR<int, 8>VA;
int x;
x = *(VA + 4);
```

The code above assigns the 4th element in the vector to which VA is pointing to the scalar variable x.

Passing a vector pointer as an argument to a function.

Given the above declaration of VA, one can pass the pointer to the function as follows:

```
DCT_fn (VA);
```

The DCT_fn function interface would have the following syntax:

```
void DCT_fn (int __VECTOR[16] VA)
{
    //DCT_fn function code here .....
}
```

Here is an example demonstrating efficiency of VIVID. Consider the following C program to shuffle two vectors:

```
void shuffle (int VA[], int VB[], int VC[], int VD[])
{
    int i, j;
    d = 0;
    for (i = 0; i < 7; i+ = 2)
    {
        VC[i] = VA[j];
        VC[i+1] = VB[j];
        j++;
    }
    j = 4;
    for (i = 0; i < 7; i+ = 2)
    {
        VD[i] = VA[j];
        VD[i+1] = VB[j];
        j++;
    }
}
```

In VIVID, this program can be written as just one instruction:

VD @@ VC=VA @shfl VB;

Name Spaces

All of the Vector Co-Processor (VCP) functions are in a VCP name space such as VCP::fn_name. Thus they cannot not be accidentally called from the ARM7 program. Furthermore, the I/O libraries will have 2 different versions one for the VCP side, and one for the ARM7 side. The VCP libraries will also belong to the VCP name space. Thus for example, the VCP program will use VCP::fopen, VCP::fwrite, etc. On the other hand, the ARM7 program will continue to use fopen and fwrite to call the ARM7 versions of these functions.

VIVID's Parallel Programming Extensions of C/C++

VIVID also provides extensions to facilitate writing dual-threaded programs for both the Vector Processor (VP) and the ARM processor and managing the synchronization and coordination between the two programs. A method for coordinating and synchronizing dual processors suitable for use in the present invention is described in U.S. patent application Ser. No. 08/703,434, filed Aug. 26, 1996 and entitled "Coordination and Synchronization of an Asymmetric, Single-Chip, Dual Multiprocessor" of Moataz A. Mohamed, Heonchul Park and Le Trong Nguyen, which is herein incorporated by reference in its entirety. The major features provided by VIVID are tasking via a fork/join mechanism, barrier synchronization and locks and semaphores.

Explicit Tasking via Fork/Join

Figure 1:
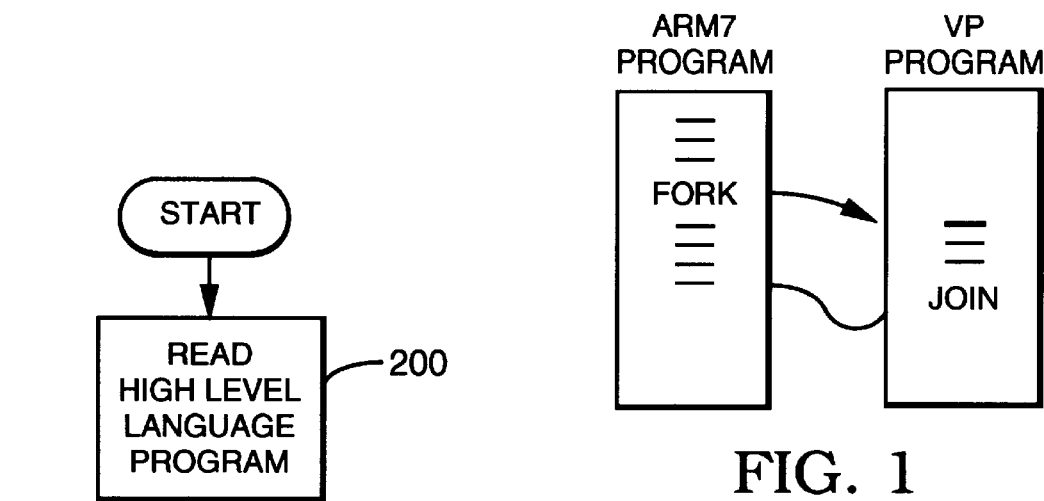
FIG. 1 is a block diagram illustrating interaction between two programs according to the present invention.

According to the MSP programming model, the ARM7 processor can control the VP, but the VP cannot control the ARM7 processor. The ARM7 program is responsible for scheduling tasks on the VP and maintaining synchronization with these tasks. To this end two constructs are provided in VIVID (see FIG. 1):

```
FORK <function_identifier>; //FORK can only appear
              //in the ARM7 segment of a VIVID program.
JOIN;    //Join can only appear in the VP segment of
              //a VIVID program.
```

The semantics of the FORK statement is that the VP would start executing the function specified in the fork while the ARM7 program would execute the statements after the FORK. The FORK statement generates the instruction:

STARTVP.cond // see Appendix A

The semantics of the JOIN statement is that it signals to ARM7 that the VP has finished executing the task it was forked to do. The JOIN statement in VIVID generates the instruction:

VCJOIN.cond #Offset // see Appendix A

Barrier Synchronization

In parallel processing programming, it is often needed to have a point in the programs at which it is guaranteed that the processors are executing synchronously. This point is known as a barrier. In case of the MSP, there are two processors, the VP and the ARM7. Thus the semantics of the barrier are that the first processor to reach the barrier waits for the other processor. Therefore, after the barrier point, both processors are executing synchronously. Barrier synchronization is implemented using the VSYNCH, VPTEST, and VCINT instructions.

The VIVID syntax for the barrier is:

```
VCP::Barrier (VPThread_id. ARMThread_id);
                              // in VP segment
ARM::Barrier (VpThread_id, ARMThread_id);
                              // in ARM7 segment
```

Locks and Semaphores

VIVID also provides features for lock management. The LockVar declares a variable to be a lock variable, i.e. a variable in shared memory which both the VP and the ARM7 programs use to gain exclusive access to a shared data structures, or to implement critical sections.

Then, the VIVID program uses the LOCK construct to request access to the lock. This function is atomic and is implemented using the TESTSET instruction described in Appendix A. If the lock cannot be acquired, the program waits for the lock variable and does not execute past the LOCK statement. The VIVID UNLOCK statement releases the lock, and marks the end of the critical section, i.e. the code requiring mutual exclusion.

```
LockVar x; //Declares x to be a lock variable.
LOCK (x);
//critical section code here...
UNLOCK(x);
```

Locks and semaphores can be implemented using the TESTSET instruction.

BNF Grammar for the VIVID Programming Language $\vec{C}$

The following grammar specifies the syntax of VIVID's vector extensions in Backus-Naur Form (BNF). The BNF is a formal notation used to describe the syntax of a programming language.

A typical BNF has four components: a set of tokens, known as terminal symbols; a set of nonterminal symbols; a set of productions, consisting of a separator ("::=" herein), a nonterminal symbol on the left of the separator and one or more sequences of tokens and nonterminals on the right of the separator, separated by an OR ("|" herein) indicating that the sequences to the left and to the right of the OR are used in the alternative; and a designation of a nonterminal start symbol.

The syntax of a language is specified in a BNF by a set of productions, the first of which begins with the start symbol and the last of which ends with a set of terminal tokens. Intermediate productions are used to further define each nonterminal in the first production so that each nonterminal can eventually be substituted by a sequence of nonterminals. Every statement in the language specified by the BNF can be generated by starting with the start symbol and substituting each element in the first production according to a subsequent production to generate a list of tokens describing the statement.

The VIVID BNF builds upon the grammar of the ANSI C language presented in the Appendix A of Kernighan & Ritchie. All constructs and changes for vector extensions appear in bold face.

| <Statement>::= | <Labeled-statement> |
| | \|<expression-statement> |
| | \|<compound-statement> |
| | \|<selection-statement> |
| | \|<iteration-statement> |
| | \|<jump-statement> |
| | \|<VECTOR-Statement> |
| <VECTOR - | <VECTOR-expression>; |
| Statement>::= | |
| <VECTOR- | <VECTOR-assignment-expr> |
| expression>::= | \|<VECTOR-expression>, |
| | <VECTOR-assignment-expr>; |
| <VECTOR-assign- | vector_identifier_VECTOR_ARITH_EXP |
| expr>::= | R; |
| | vector_identifier @@ |
| | vector_identifier = |
| | VECTOR_SPECIAL_] |
| | \|vector_identifier=VECTOR_LOGIC_EX |
| | PR; |
| | \|vector_identifier=VECTOR_SPECIAL_ |
| | EXPR; |
| <VECTOR_ARITH_EX | vector_identifier<arith_op>vector_ |
| PR>::= | identifier |
| <VECTOR_SPECIAL_ | identifier @ <Voperator> |
| EXPR>::= | identifier |
| | <Voperator>::=addh\|avg\|sub2\|aas3\|s |
| | hfl\|unshfl\|maxe\|....etc. |

Some embodiments expose vector processor architecture in high-level languages other than C and C++. As used herein, a high level language is any language of a higher level than the assembler language. In some embodiments, a high level language includes at least one instruction such that, for this instruction, the high level language does not specify how exactly this instruction is implemented in the machine language. For example, consider the C language code int a, b, c;
a=b+c;

This instruction may be implemented by the following machine language, where A, B and C represent the logical memory address of the variables a, b and c:

```
VL.w     SR1, B, #0
VL.w SR2, C, #0
VADD.w   SR3, SR1, SR2
VSTO.w   SR3, A
```

In some embodiments, a high level language includes memory variables but does not specify how the variables are stored in the vector processor. For example, if a C language program defines int a;

the variable "a" can be stored in main memory or in a register. Even when a C language program specifies that a variable is to be stored in a register if a register is available, and even if the variable indeed gets stored in a register, the concrete register is not specified in the C program but is defined by the C compiler. An advantage of the high level language as described above is sparing the programmer from implementation details such as concrete machine instructions or how a variable is to be stored.

Of note, while we expose instructions of a vector processor, we still spare the programmer from deciding where exactly the variables will be stored—in main memory or in registers, and in which registers. However, we enable the programmer to assist the compiler in creating efficient machine code (i.e small code which is fast to execute).

This is achieved by allowing the programmer to define data types that are supported by the vector processor (288-bit vectors, byte9). Even if a vector has a size that is not supported by the vector processor, it is simple for the compiler to allocate a combination of vectors in the vector processor which in combination form (or include) a vector of the size specified in our __VECTOR statement.

In addition, the C language extensions of the present invention include instructions that correspond to instructions of the vector processor. If the operands of the C instruction have data types supportable for a corresponding vector processor instruction, then the compiler can easily translate the C instruction into a corresponding VP instruction. If the operands' data types are not directly supported by the VP instruction (for example, one operand is a vector of a size of 70 bytes rather than 64 bytes), the compiler can fairly easily use corresponding VP instruction several times to implement the C instruction.

Embodiments described above illustrate but do not limit the invention. In particular, the invention is not limited to an extension of any high level programming language or type of processor. Some embodiments provide a different set of operations. Some embodiments have more than two processors. Other embodiments and variations are within the scope of the invention, as defined by the following claims.

I claim:

1. A method for creating a computer program on a computer readable media for execution by a vector processor, the method comprising:

a computer system reading a computer program written in a superset of C programming language, wherein the C programming language defines a plurality of operations and does not specify for each operation in said plurality how the operation is to be implemented in the vector processor, the computer program further including:

a declaration of a value having a vector type, the vector type being part of a programming model of the vector processor, the vector type being distinct from an array type included in the C programming language; and a first operation having the vector type value as an operand, the first operation corresponding to a vector processor instruction VPI1 that can be executed by the vector processor and that has at least a vector operand; and the computer system generating one or more vector processor instructions that together implement the first operation, the one or more instructions including one or more VPI1 instructions.

2. The method of claim 1, wherein said high level language does not specify for each value whether the value is to be stored in a register of the vector processor or in a memory external to the vector processor.

3. The method of claim 1, wherein the program does not specify how the vector type value is to be stored.

4. The method of claim 1, wherein:

the computer program further includes declaration of a selection mask; and the first vector operation is subjected to the selection mask to determine which elements of the vector operand are operated upon.

5. The method of claim 4 wherein:

the first operation does not have the selection mask as an operand.

6. The method of claim 4 wherein:

the first operation is a vector ALU operation; and each bit in the selection mask indicates if a corresponding element of the vector operand is affected by the first operation.

7. The method of claim 4 wherein:

the first operation is a memory access operation; and each bit in the selection mask indicates if a corresponding element of the vector operand is affected by the first operation.

8. The method of claim 1, wherein said first operation comprises one or more arithmetic operations.

9. The method of claim 1 wherein a destination of the first operation has a plurality of operands.

10. The method of claim 1, wherein said first operation comprises one or more matrix operands.

11. The method of claim 1, wherein said first operation comprises one or more 9-bit operands.

12. The method of claim 1, wherein said superset includes the C++ programming language.

13. The method of claim 1, wherein said computer system comprises a control processor, the vector processor and a cache memory coupling said control processor to said vector processor.

14. The method of claim 13, wherein the control processor signals the vector processor to start execution, but the vector processor cannot cause the control processor to start execution.

15. The method of claim 1 wherein:

the value is included in a structure type of the C programming language.

16. The method of claim 1, wherein:

the value is a pointer.

17. The method of claim 16, wherein:

the first operation passes the pointer as an argument to a function.

18. The method of claim 1, wherein:

the vector operand is hereinafter referred to as VA; and the first operation indicates calculation of the average of each element of VA with index value i with the element having an index value of i+1 and storing the average in the element having an index value of i of a result vector.

19. The method of claim 18, wherein:

the vector operand is hereinafter referred to as VA;

the first operation has another vector operand VB; and the first operation indicates calculation of the average of each element of VA having an index value i with the element of VA having index value i+1 and the elements of VB having index values i amd i+1 and storing the average in element having index value of i of a result vector.

20. The method of claim 1, wherein:

the first operation is a logical operation selected from a group consisting of AND, OR and NOR.

21. The method of claim 1, wherein:

the first operation is a shift operation with a scalar operand s that indicates the number of bits to be shifted, and the shift operation being selected from a group consisting of left shift and right shift.

22. The method of claim 1, wherein the first operation is selected from a group consisting of:

a max exchange operation;

an extract sign operation; and a count leading zeros operation.

23. The method of claim 1, wherein:

the first operation has a scalar operand i; and the first operation divides the vector operand by $2^i$ and stores the result in another vector operand.

24. The method of claim 1, wherein:

the vector operand is hereinafter referred to as VA;

the first operation also has a scalar operand i; and the first operation extracts the ith element of vector VA and stores the result into another scalar operand.

25. The method of claim 1, wherein:

the vector operand is hereinafter referred to as VA;

the first operation has additional vector operands VB, VC and VD; and the first operation indicates multiplication of each element of VA by the corresponding element of VB, then addition of the corresponding element of VC to the double precision result of the multiplication and storing the double precision result of the addition in the corresponding element of VD.

26. The method of claim 1, wherein:

the vector operand is hereinafter referred to as VA;

the first operation stores the result into another vector operand VC in an element j that is different from an element i of VA.

27. The method of clam 26, wherein:

the first operation has additional vector operands VB and VD; and the first operation shuffles the elements of vector VA and VB and stores the result in vectors VC and VD.

28. The method of claim 26, wherein:

the first operation has additional vector operands VB and VD; and the first operation unshuffles the elements of vector VA and VB and stores the result in vectors VC and VD.

29. The method of claim 26 wherein:

the first operation has an additional vector operand VB; and the first operation is specified in the computer program by an operator located between VA and VB.

30. The method of claim 1, wherein the first operation is selected from a group consisting of:

a multiply and add operation;

an add and add sign operation; and an add horizontal operation.

31. The method of claim 30, wherein:

the first operation is specified in the computer program by an operator located between the vector operand and another operand.

32. The method of claim 1, wherein:

the declaration includes an initialization of the vector operand, the initialization being specified by use of the "=" sign, followed by a plurality of values for elements in the vector operand, the plurality of values being enclosed within the "{" and "}" signs.

33. The method of claim 1 wherein:

the first operation is specified in the computer program by an operator located between the vector operand and another operand.

34. The method of claim 33 wherein:

the operator includes a predetermined symbol followed by at least one letter of the English language, the predetermined symbol being not included in the C programming language.

35. The method of claim 33 wherein:

the superset has a grammar that extends the grammar of the ANSI standard of C language.

* * * * *